Jan. 10, 1956
V. I. CHICANE
2,730,227
MOBILE GRAIN ELEVATOR
Filed Feb. 16, 1953
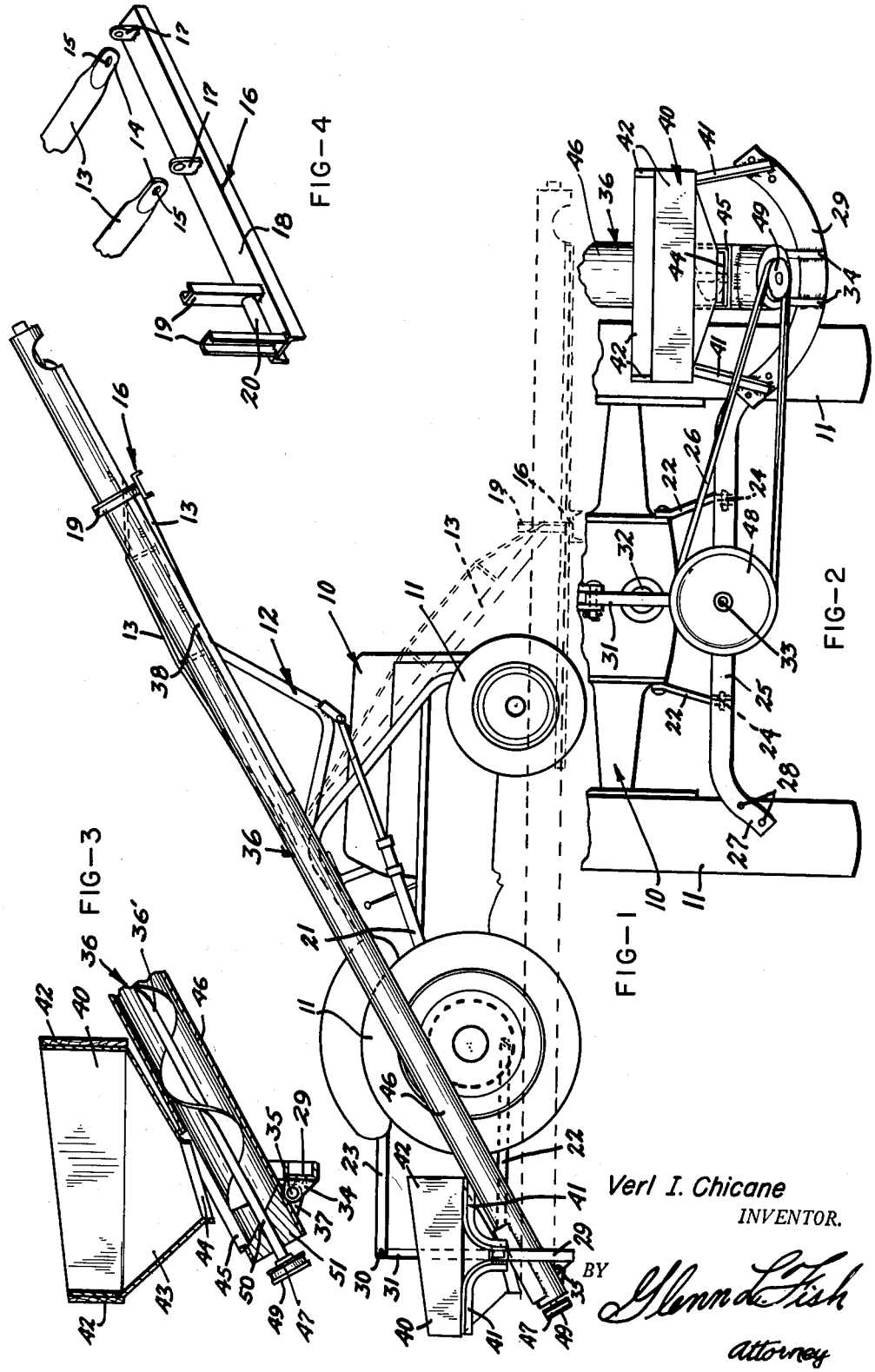
Verl I. Chicane
INVENTOR.
BY Glenn L. Fish
Attorney United States Patent Office 2,730,227
Patented Jan. 10, 1956

2,730,227

MOBILE GRAIN ELEVATOR

Verl I. Chicane, Cottonwood, Idaho

Application February 16, 1953, Serial No. 337,037

2 Claims. (Cl. 198—53)

This invention is a mobile grain elevator and it has for one object the provision of a grain conveyor pivotally carried at one end on a vehicle and freely supported at the other end by the vehicle's adjustable lift for selectively positioning the discharge end of the conveyor.

Another object of the invention lies in the provision of a grain conveyor combined with a tractor having a power-operated lift, said conveyor receiving its power from the tractor and being selectively positioned by means of the lift.

Another object of the invention lies in the provision of a grain elevator which is removably carried by a tractor and especially designed for ease in mounting and removing the conveyor at either side of the tractor.

Another object of the invention lies in the provision of a mobile grain elevator which is relatively inexpensive to manufacture and is constructed and arranged with a minimum number of parts and, therefore, not liable to become inoperative or require repairs to a great extent.

These and other objects of the invention will become apparent during the course of the following description.

In the accompanying drawing, forming a part of this specification, and in which like numerals are employed to designate like parts, Figure 1 is a side elevation of a tractor supporting the combined grain elevator and showing by full lines the conveyor in its extreme raised position and by dotted lines in its lowered position;

Figure 2 is a fragmentary rear elevation showing the conveyor mounted upon the tractor;

Figure 3 is a vertical longitudinal fragmentary cross section taken through the lower end of the conveyor and its receiving bin; and Figure 4 is a perspective view showing the cross beam which is a part of this invention.

Referring now more particularly to the drawing, I have shown a tractor indicated in general by the numeral 10. The tractor may be one of the many commercial or individually built types and may have wheels 11 as shown, tracks or other propelling means. The tractor is provided with a power-operated lift mechanism 12 of conventional construction and which has spaced longitudinally extending arms 13 pivotally carried by the tractor. The arms 13 have their forward ends free to traverse an arc about the pivot common to both arms and these free ends of the arms 13 are flattened as at 14 and have formed therein axially aligned holes 15, through which bolts or other securing pins are passed to pivotally secure the cross beam 16 to the ears 17 welded or otherwise fastened to the cross beam. The cross beam 16 is designed with the spaced ears offset toward one end thereof, thus providing an extension portion 18 of a length adapting the end of the cross beam to extend beyond the transverse dimension of the tractor 10.

Parallel guide posts 19 are welded or otherwise secured to the beam 16 and a roller 20 is journalled therebetween. This construction provides for easily attaching and removing the cross beam and obviously the beam 16 may be reversed so that the guides 19 and roller 20 may be disposed at the opposite side of the tractor when desired.

The power-operated lift mechanism 12 is usually driven by means of a pair of hydraulic-servo motors 21 suitably connected and secured to the tractor to pivot the arms 13 as indicated.

The tractor 10 is provided at its rear end with spaced draw bars 22 and also a power-operated implement bar 23. The draw bars and implement bar are designed to cooperate to raise and lower and otherwise permit operation of any implement used in connection with the tractor.

At the outer ends of the draw bars 22 I pivotally secure a transversely extending frame 25 by means of pins 24 extending through the draw bars and ears 26 welded or otherwise secured to the frame 25. The frame is channel-shaped in cross section and is provided with downwardly turned end portions 27, which are drilled at 28 to receive bolts for removably securing an arcuate saddle 29 at either end of the main frame section 25.

The implement bar 23 is pivotally united at 30 to a vertical arm 31 secured to the frame 25 midway its length, and the frame 25 may thereby be vertically positioned within the limits of movement of the hydraulically powered implement bar.

The tractor is provided with the usual power take-off 32 and this rotary power is utilized by connecting a power shaft 33, journalled in the frame 25, to the power take-off 32 by means of one or more conventional universal joints. This construction permits raising and lowering of the frame 25 while the power shaft 33 is connected to the power take-off 32.

The saddle 29 is provided midway its length with spaced supporting brackets 34 and these brackets are provided with transversely aligned openings which receive a journal pin 35.

A spiral conveyor 36 is provided with ears 37 adapted to cooperate with the brackets 34 and the pin 35 pivotally unites the conveyor 36 with the saddle 29, frame 25, and thereby to tractor 10. A length of channel iron 38 is secured to the bottom side of the spiral conveyor 36 adjacent its forward free end and this is provided as a surface for cooperating with the roller 20 to eliminate damage to the forward end of the conveyor supported by the beam 16 and power-operated lift 12. Therefore, it will be seen that the spiral conveyor may be pivoted at 35 and have its forward or discharge end 39 selectively adjustable to vertical positions. Since the pivot point of the arms 13 is eccentric to the pivot of the conveyor, the roller traverses the length of the channel during vertical tilting movement of the conveyor.

To admit grain to the conveyor 36, I have provided a receiving bin 40. The bin is supported by legs 41 carried on the saddle 29 and has upstanding walls 42 at its edges to confine the grain to the bin. The bin is provided with a downwardly converging bottom 43 which terminates in a discharge mouth. The bottom 43 is formed of sheet metal which extends upwardly and lines the inside face of the walls 42. The discharge mouth 44 communicates with a rectangular aperture 45 in the top side of the spiral conveyor housing 46 thus forming a flexible conduit communicating the bin and conveyor. Therefore, it will be seen that grain may be dumped from a truck, from sacks, shovelled, or otherwise deposited in the receiving bin 40 and the grain may be elevated by the conveyor and discharged at a desired height.

The spiral 36' of the conveyor is driven by means of a belt 47 trained about pulley 48 carried by the power shaft 33 and pulley 49 carried by the spiral shaft 50 journalled in a plug 51 in the lower end of the conveyor housing 46. It will be noted that the plug is enlarged at the lower side to provide adequate strength to support the conveyor on the ears 39.

When transporting the elevator from one place to another, the implement bar 23 is used to raise the frame 25, thus causing the rear end of the elevator to clear the ground sufficiently to avoid its striking any obstruction. The front end, of course, may be adequately controlled by means of the lift 12 during movement of the elevator.

Having thus described my invention, I claim:

1. The combination with a tractor having a power-operated lift, vertically tiltable draw bars and a power take-off; of a grain elevator having a transversely disposed support frame releasably secured to said draw bars; a spiral conveyor pivotally carried at one end by said frame for vertical tilting movement in a plane longitudinally parallel and outwardly spaced from said tractor; said lift being adapted to freely support said conveyor at a point removed from said pivot, to impart selective vertical tilting movement thereto; a fixed receiving bin carried by said frame and communicating through a flexible conduit with said conveyor adjacent its pivoted end; and power transmission means operably uniting said power take-off and said spiral conveyor whereby said conveyor is driven.

2. A mobile grain elevator comprising a frame adapted to be releasably secured to the draw bar of a tractor having a power operated lift and disposed transversely with relation to the tractor; a saddle forming part of said frame and releasably secured to a selected one of its ends; a power shaft having a pulley on its outer end and rotatably carried by said frame, for connection with the power take-off of said tractor; a spiral conveyor having its rear end portion pivotally carried by said saddle for vertical tilting movement in a plane parallel with the longitudinal axis of said tractor and outwardly spaced therefrom; a fixed receiving bin carried by said saddle and communicating through a flexible conduit with said conveyor; a belt operably uniting said pulley and said spiral conveyor; and a cross beam adapted to be carried by the lift of said tractor and adapted to freely support the free end of said conveyor at heights selectively controlled by said lift.

References Cited in the file of this patent

UNITED STATES PATENTS

| | | |
|---|---|---|
| 1,706,313 | Newdick | Mar. 19, 1929 |
| 1,728,680 | Hartley et al. | Sept. 17, 1929 |
| 1,892,495 | Vorthmann | Dec. 27, 1932 |
| 2,374,903 | Spiegl | May 1, 1945 |
| 2,408,952 | Raney | Oct. 8, 1946 |
| 2,579,364 | Collins | Dec. 18, 1951 |
| 2,594,221 | Ryan | Apr. 22, 1952 |
| 2,616,579 | Kill | Nov. 4, 1952 |
| 2,620,934 | Smoker | Dec. 9, 1952 |